Patented Oct. 28, 1952

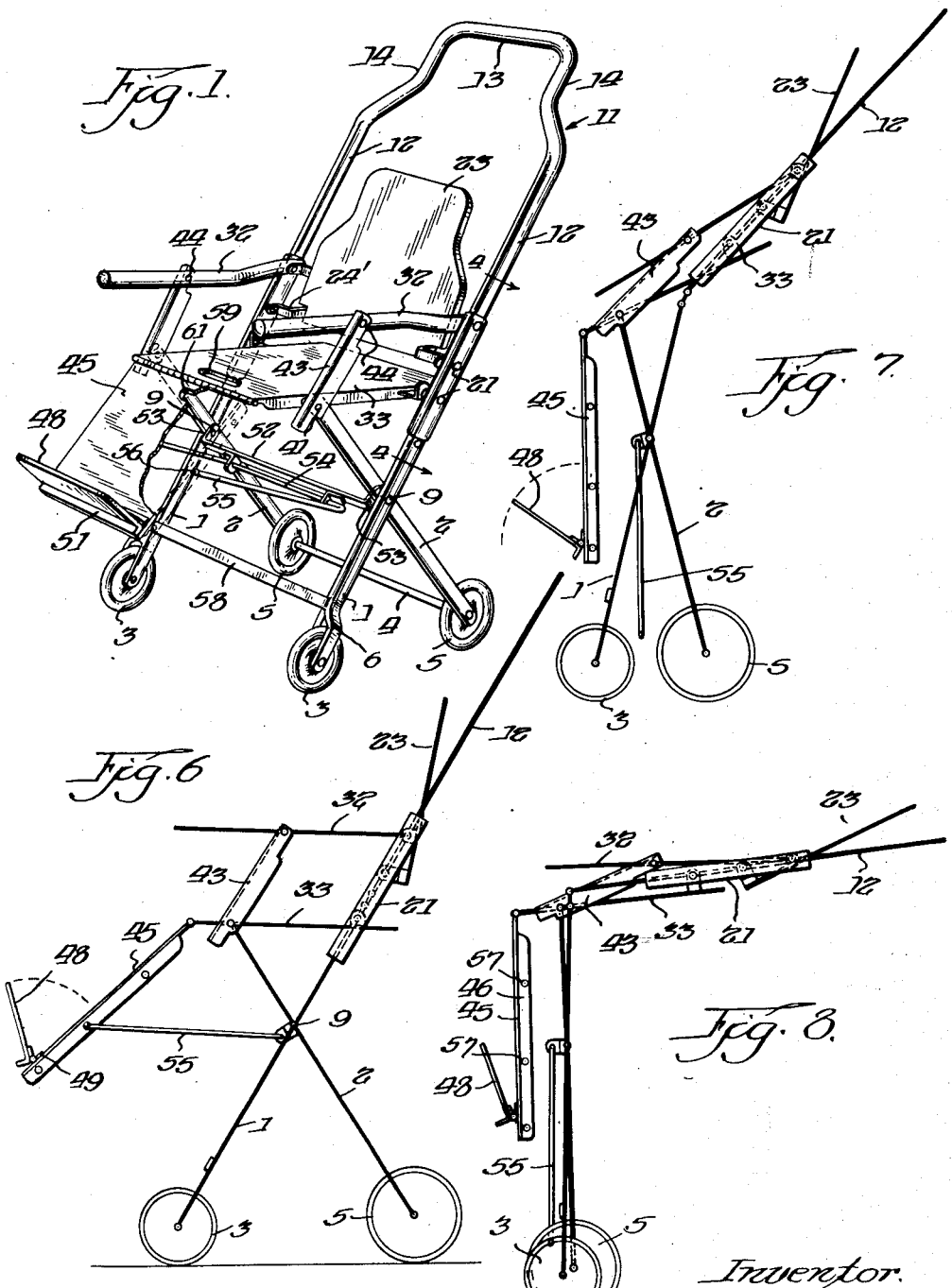

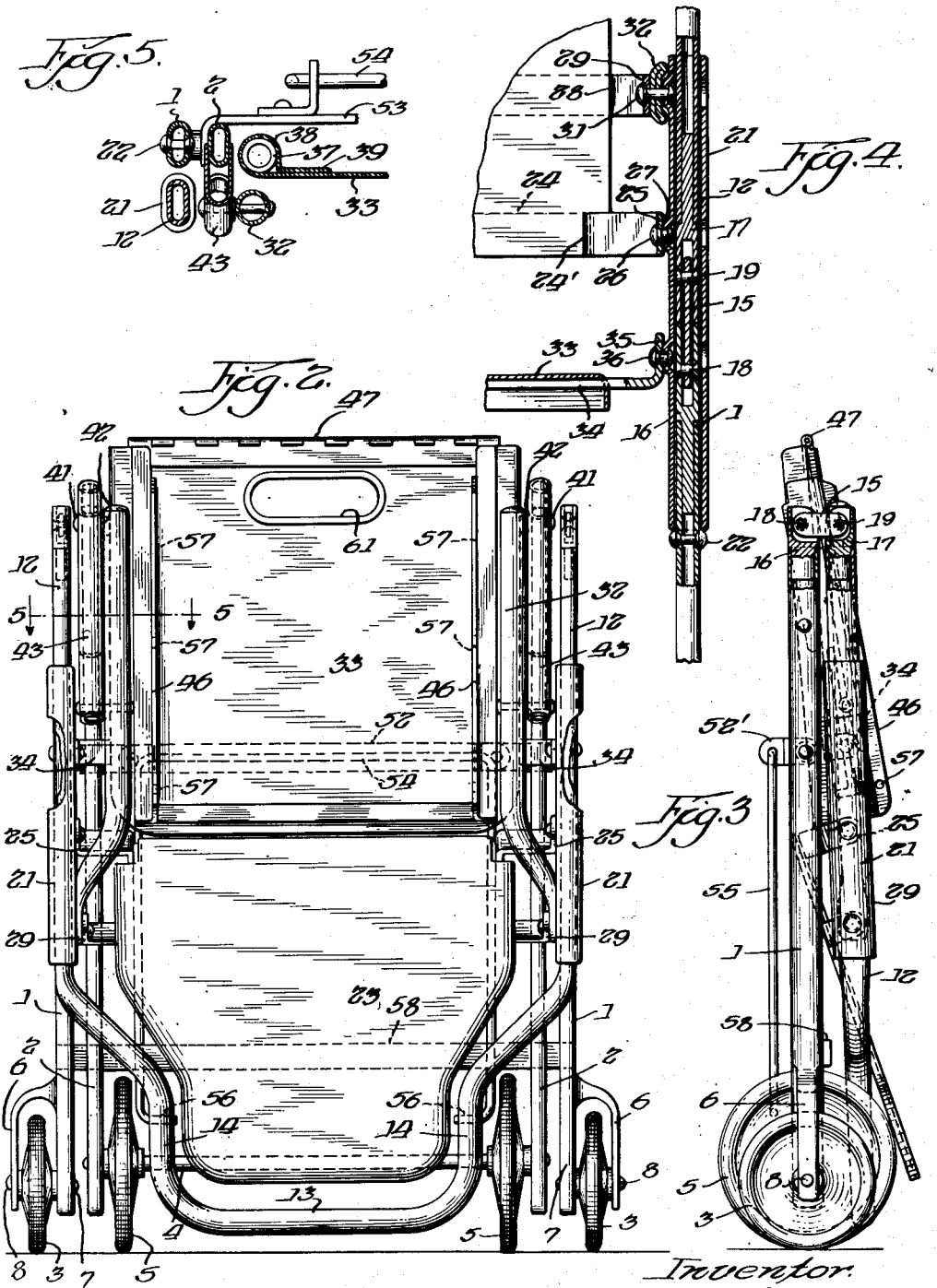

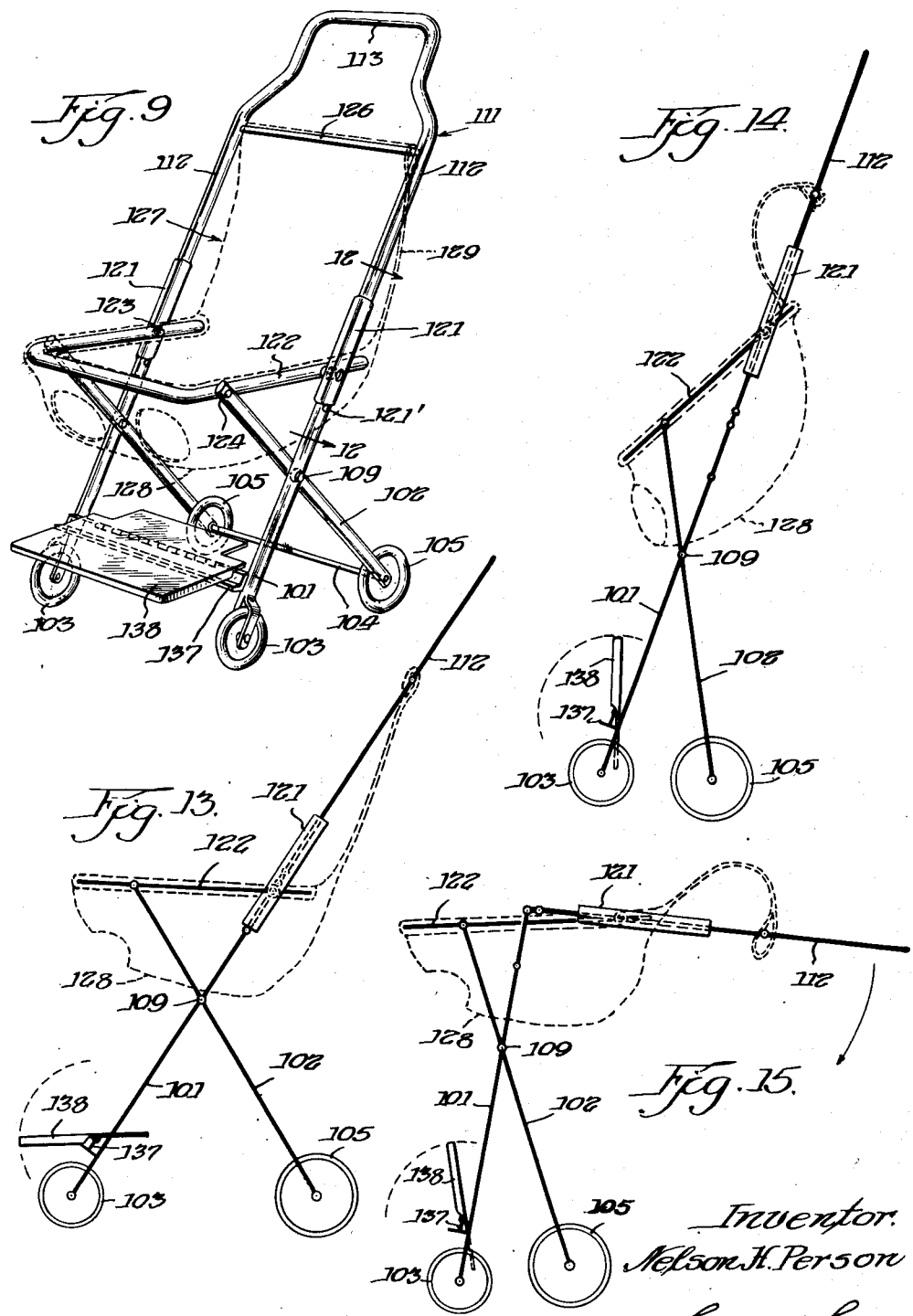

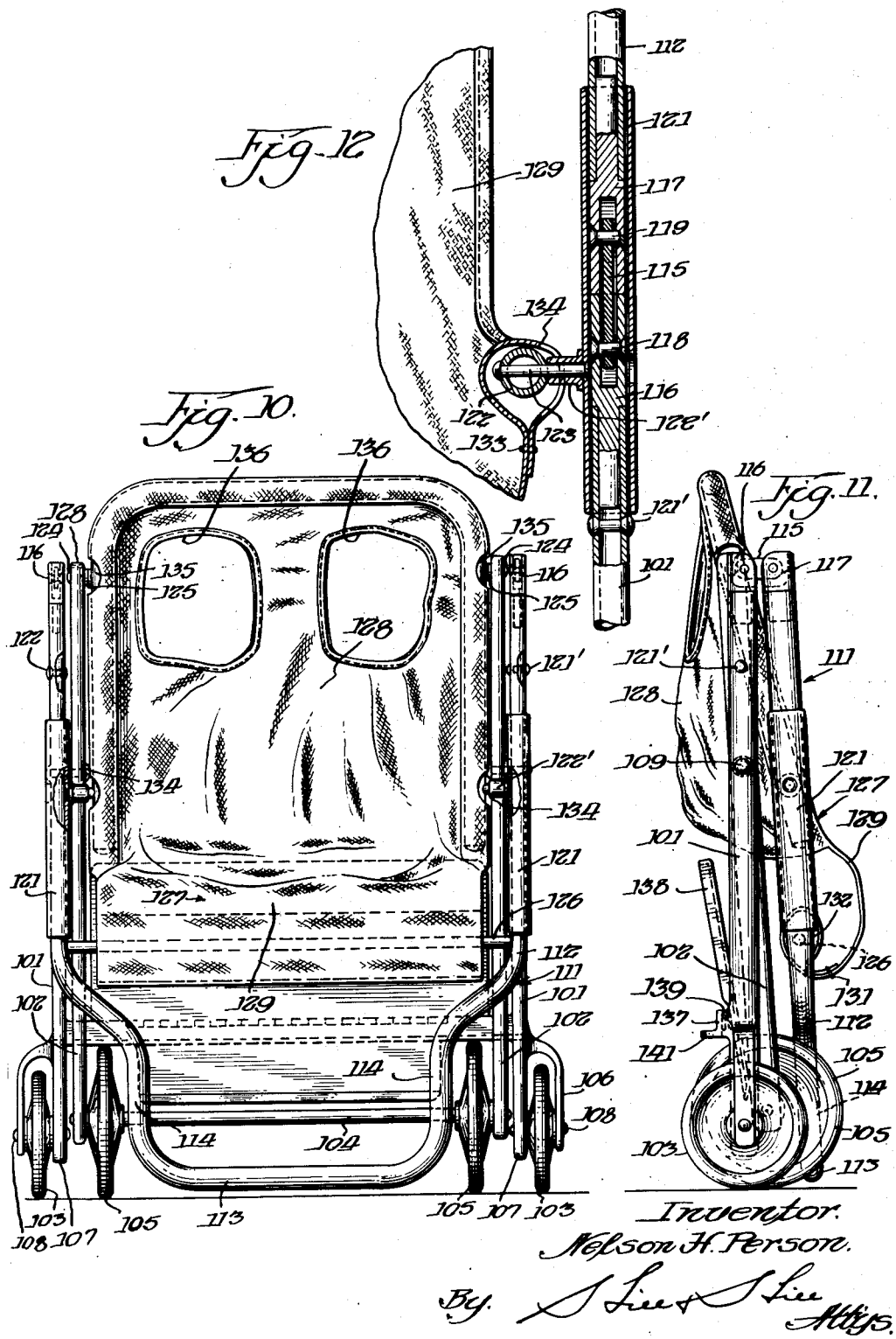

2,615,725

UNITED STATES PATENT OFFICE 2,615,725

FOLDING GOCART

Nelson H. Person, Chicago, Ill.

Application March 31, 1949, Serial No. 84,689

18 Claims. (Cl. 280—41)

The invention relates generally to a seating structure, or the like, and more particularly to a foldable go-cart construction.

The invention has among its objects the production of a go-cart, or the like, which is very light and strong, and which may be compactly folded into a relatively small bundle whereby the same may be readily carried or stored when not in use.

Another object of the invention is the production of such a seat construction which may be readily folded or opened, and when in its opened position, is rigidly maintained in such position.

A further object of the invention is the production of a go-cart which may be inexpensively manufactured, is very durable, and may be constructed for supporting small babies, children, or adults; thus in the adult size it may be employed as a foldable wheel chair, or the like.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters represent like or corresponding parts:

Fig. 1 is a perspective view of a cart embodying the present invention;

Fig. 2 is a rear view of the cart illustrated in Fig. 1 in completely folded position;

Fig. 3 is a side elevational view of the cart, folded as illustrated in Fig. 2;

Fig. 4 is a sectional view of a portion of the handle structure taken approximately on the line 4—4 of Fig. 1;

Fig. 5 is a sectional view through a portion of the device taken approximately on the line 5—5 of Fig. 2;

Fig. 6 is a diagrammatic side elevational view of the cart in open position;

Fig. 7 is a diagrammatic view, similar to Fig. 5, illustrating the cart in partially folded position;

Fig. 8 is a diagrammatic view illustrating the cart in a partially folded position;

Fig. 9 is a perspective view of a cart embodying the present invention adapted for use with small babies, or the like, with the canvas seat and back removed, indicated in dotted lines;

Fig. 10 is a rear elevational view of the cart illustrated in Fig. 8 in folded position;

Fig. 11 is an end elevational view of the cart in substantially folded position;

Fig. 12 is a sectional view taken approximately on the line 12—12 of Fig. 9;

Fig. 13 is a diagrammatic side elevational view of the cart illustrated in Fig. 9 in open position;

Fig. 14 is a diagrammatic view similar to Fig. 13 with the cart in partially folded position; and Fig. 15 is a diagrammatic view similar to Fig. 13 with a cart in a further partially folded position.

The carts illustrated in Figs. 1 and 9 are foldable in a similar manner, the main difference between the two carts being in the provision of a rigid back and seat in the construction illustrated in Fig. 1 and adapted to be manufactured in children's and adult sizes, whereas the construction in Fig. 9 utilizes a fabric seat and back portion and is adapted for use with small babies.

The cart illustrated in Fig. 1 comprises a pair of spaced front legs 1, and a corresponding pair of spaced rear legs 2, with each front leg 1 having a wheel 3 rotatably mounted thereon, and the rear legs 2 being connected adjacent their lower ends by an axle 4 on which is rotatably mounted a pair of rear wheels 5, the latter being positioned between the legs 2. In the construction illustrated, the lower end of each front leg is provided with an extension 6 extending parallel to the end portion 7 of the leg to form a fork in which is carried the wheel 3, the latter being mounted on a suitable spindle 8 extending between the portions 6 and 7. The legs 1 and 2 are pivoted intermediate their ends, as indicated at 9, whereby the legs 1 and 2, when the cart is in open position, form an X-shaped structure with the front legs being outermost and extending upwardly and rearwardly, and the rear legs extending upwardly and forwardly, as clearly illustrated in Figs. 1 and 6. Operatively connected to the upper ends of the front legs 1 is a substantially U-shaped top or handle member, indicated generally by the numeral 11, and having substantially parallel side legs 12 connected at their upper ends by a connecting portion 13 forming a handle. The upper portions of the legs 12 are offset inwardly, as indicated at 14, to facilitate the compact folding of the device, as will hereafter be explained, and the free end of each leg 12 is operatively connected to the upper end of a respective front leg 1 by a link 15 pivoted at its respective ends to the front leg and the corresponding leg 12 of the member 11. The legs 1 and 2, and handle member 11 are preferably made from tubular metal stock of a light weight metal as, for example, aluminum, and in the construction illustrated, the ends of the legs connected to the respective links 15 are formed to provide clevises 16 and 17 on the respective legs 1 and 12, the links 15 and the respective leg members being pivotally connected by rivets 18 and 19.

Slidably mounted on each leg 12 of the member 11 is a locking sleeve 21, which is adapted to be positioned upon the upper portion of the respective front legs 1 when the device is in open position, as clearly illustrated in Fig. 4, a suitable stop, such as the rivet 22, being mounted on each leg 1 and engageable with the locking sleeve 21 to limit the downward movement of the sleeve on the leg 1.

Carried by the sleeves 21 is a rigid back member 23 formed of suitable material as, for example, sheet aluminum, the back member being connected adjacent its lower edge to the respective sleeves by a reinforcing cross member 24, each of the free ends of the latter being offset, as indicated at 24', and terminating in an apertured flange 25 connected to the respective sleeves 21 by any suitable means, such as rivets 26, the adjacent portion of each sleeve 21 being outwardly dished, as indicated at 27, whereby the inner end of the rivet 26 is recessed or countersunk, thus preventing engagement of the same with the legs 12 as the sleeves 21 are moved along the legs. The back 23 is also connected to the sleeves 21 by a second cross member 28, each of the ends of which terminate in an apertured flanged portion 29 secured to the adjacent sleeve 21 by a rivet 31, the inner head of the rivet 31 likewise being recessed in a manner similar to the rivet 26. Thus the back member 23 is rigidly connected to the sleeves 21. Also connected to the respective sleeve 21 by the rivets 31 are arm members 32, the length of the rivets 31 being such that pivotal movement of the arm members relative to their respective sleeves is permitted.

Also pivotally connected to the sleeves 21 is a seat member 33, the seat being connected to the sleeves 21 by a cross member 34 rigidly secured to the seat, the free ends of the member 34 each terminating in an apertured flange portion 35 pivotally connected to the respective sleeves by rivets 36, the inner heads of which are recessed in a manner similar to that described for the rivets 26, the length of the rivets 36 being such that pivotal movement of the seat member 33 relative to the sleeves is permitted. As illustrated in Fig. 5, the seat member 33 is reinforced along its side edges by tubular members 37, the sheet material forming the seat 33 being formed around the members 37, as indicated at 38, and terminating in flanged portion 39, which may be suitably secured by welding, or the like, to the lower surface of the seat 33. The seat member is also pivotally secured to the upper ends of the rear legs 2 by rivets 41, each of which passes through a respective leg 2 and the adjacent tube 37 of the seat member, the latter being spaced from the adjacent leg 2 by a washer 42. Also pivotally connected to the respective legs 2 and the seat 33 by the respective rivets 41 are arm supporting members 43, the latter being formed from sheet stock and of substantially U-shape in cross section, as illustrated in Fig. 5. The upper or free ends of each member 43 are pivotally connected to a respective arm 32 by rivets 44.

Hingedly connected to the seat 33 along the front or forward edge thereof is a kickboard 45, likewise formed of suitable sheet material, and being provided with suitable transversely extending reinforcing flanges 46 adjacent each side edge of the board 45. In the construction illustrated, the connection between the seat 33 and board 45 is of the piano hinge type, as indicated at 47, and extends entirely across the seat. Pivotally mounted on the board 45, adjacent the bottom edge thereof, is a footrest 48, the latter being connected to the board 45 by piano hinge 49, or the like. As illustrated in Figs. 1 and 6, the footrest 48 is provided with a downwardly extending flange 51 adjacent its pivotal connection to the board 45, the flange 51 being adapted to engage the lower portion of the board and act as a stop to maintain the footrest 48 in operative position, as illustrated in Fig. 1, but permitting the footrest 48 to be rotated into a position adjacent to and substantially parallel with the plane of the board 45.

Extending between the respective pairs of legs at each side of the device is a cross member 52, the ends of which terminate in transversely extending flange portions 53 connected to the opposite pairs of legs by the rivets 9, which pivotally connect each adjacent front and rear leg. Pivotally connected to the cross member 52 by brackets 52' is a U-shaped bail member 54, the free ends 55 of which terminate in aligned, inwardly extending portions 56 adapted to be positioned in any one of a plurality of holes 57 in the reinforcing members 46, thus supporting the kickboard 45 and footrest 48 in any one of a plurality of operative positions, depending upon the particular pair of holes 57 in which the portions 56 of the bail are positioned. If desired, a cross member 58 may be rigidly connected at its ends to the respective front legs 1 to provide additional reinforcement for the latter.

Assuming the device is in operative open position, as illustrated in Fig. 1, it may be folded in the following manner: The ends of the bail 54 are disconnected from the kickboard 45, and the sleeves 21 are moved upwardly along the legs 12 to expose the pivotal connections between the legs 12 and the front legs 1, with the various elements of the device assuming substantially the position illustrated in Fig. 7, and it will be noted that the handle member 11 will begin to rotate about its pivotal connection with the legs 1. As the upward movement of the sleeves 21 is continued, rotation of the handle member relative to the legs 1 and pivoting of the rear legs 2 relative to the front legs 1 is in a direction to bring the respective legs into a common plane, with the arms 32 tending to rotate into the plane of the member 11 so that the device will assume substantially the position illustrated in Fig. 3. Rotation of the handle member 11 relative to the legs is then continued until the handle member is positioned adjacent to the legs, as illustrated in Fig. 3, which discloses the device in almost completely closed position with the legs 1 and 2 lying in substantially a common plane and the rear wheels nested between the front wheels. Similarly, when in folded position the upper portions of each of the legs 2 will be partially positioned, or nested, in the adjacent arm support member 43, and permit complete folding of the device. The handle member 11 is illustrated in Fig. 3 in slightly open position to more clearly disclose the respective parts, and where the device is in completely closed position, the plane of the handle member is substantially parallel to the common plane of the legs 1 and 2, with the inset portions 14 of the member 11 nested between the rear wheels 5. The folding is completed by rotating the footrest 48 into a position adjacent to and substantially parallel with the plane of the kickboard 45. It will be noted that the width of the completely folded device, with the exception of the wheels, is merely slightly greater than the combined width of the sleeves 21 and legs 1 and 2, and less than the diameter of the large wheels.

To facilitate carrying of the folded device, the seat member 33 may be provided with a finger opening 59, and the kickboard 45 may be provided with the similar opening 61, the openings 59 and 61 being so positioned that they will be aligned when the device is in a closed position, as illustrated in Fig. 2, forming a carrying handle which may be readily grasped by inserting the fingers in the openings 59 and 61.

The cart illustrated in Fig. 9 comprises a pair of spaced front legs 101, and a corresponding pair of spaced rear legs 102, with each front leg 101 having a wheel 103 rotatably mounted thereon, and the rear legs 102 being connected adjacent their lower ends by an axle 104 on which is rotatably mounted a pair of rear wheels 105. In the construction illustrated, the lower end of each front leg is provided with an extension 106 extending parallel to the end portion 107 of the leg to form a fork in which is carried the wheel 103, the latter being mounted on a suitable spindle 108 extending between the portions 106 and 107. The legs 101 and 102 are pivoted intermediate their ends, as indicated at 109, whereby the legs 101 and 102, when the cart is in open position, form an X-shaped structure with the front legs extending upwardly and rearwardly, and the rear legs extending upwardly and forwardly, as clearly illustrated in Figs. 9 and 13. Operatively connected to the upper ends of the front legs 101 is a substantially U-shaped handle member, indicated generally by the numeral 111, and parallel side legs 112 connected at their upper ends by a handle portion 113. The upper portions of the legs 112 are offset inwardly, as indicated at 114, to facilitate the compact folding of the device, as will hereafter be explained, and the free end of each leg 112 is operatively connected to the upper ends of the respective front legs 101 by a link 115 pivoted at its respective ends to the front legs and the corresponding part of the handle member. The legs 101 and 102, and handle member 111 are preferably made from tubular metal stock of a light weight metal as, for example, aluminum, and in the construction illustrated, the ends of the legs connected to the respective links 115 are formed to provide clevises 116 and 117 on the respective legs 101 and 112, the links 115 and the respective leg members being pivotally connected by rivets 118 and 119.

Slidably mounted on each leg 112 of the handle member is a locking sleeve 121, which is adapted to be positioned upon the upper portion of the respective front legs 101 when the device is in open position, as clearly illustrated in Fig. 12, a suitable stop, such as the rivet 121', being mounted on each leg 101 and engageable with the locking sleeve 121 to limit the downward movement of the sleeve on the leg 101.

Pivotally connected to the sleeves 121 is a U-shaped seat supporting member 122 pivotally connected to the respective sleeves by spacers 122' and rivets 123, the inner heads of which are countersunk to eliminate engagement thereof with the legs 101 or 112, the length of the rivets 123 being such that pivotal movement of the member 122 relative to the sleeves is permitted.

The seat supporting member is also pivotally secured to the upper ends of the rear legs 102 by rivets 124, each of which passes through a respective leg 102 and the tube of the seat member, the latter being spaced from the adjacent leg 102 by a washer 125.

Extending between the legs 112 of the member 111 is a cross bar 126, the ends of which are rigidly secured to the legs 112 by any suitable means. Carried by the member 122 and cross bar 126 is a seat and back structure, indicated generally by the numeral 127, constructed, in the present instance, from suitable fabric and forming a seat portion 128 and a back portion 129, the latter at its upper edge being looped around the bar 126 and stitched, as indicated at 131, or otherwise secured upon itself to form a loop 132 through which the rod 126 extends. Likewise, the free edge of the member 127 adjacent the supporting member 122 is wrapped outwardly around the supporting member 122 and stitched, as indicated at 133, or otherwise suitably secured to itself, as clearly indicated in Fig. 12, the material being cut away adjacent the washers 122' and 125, as indicated at 134 and 135, whereby the fabric will not interfere with the pivotal connections between the respective members. The bottom portion 128 of the member 127 is provided with a pair of leg openings 136 through which the infant's legs may be inserted. While I have illustrated member 127 as being secured to the supporting member 122 and cross bar 126 by stitching, if desired, the member 127 may be removably mounted on its respective supporting members by employing separable closure means for the stitching 131 and 133 as, for example, suitable "zipper" elements, whereby the fabric could be removed from the device and washed or cleaned.

Connecting the front legs 101 adjacent the lower ends is a cross member 137 illustrated, in the present instance, as being formed from angle stock and rigidly connected to the respective legs by any suitable means, such as welding, or the like. Hingedly mounted on the cross member 137 is a footrest 138, the latter being connected to the cross member 137 by a piano type hinge 139, the footrest 138 being supported in operative position, as illustrated in Fig. 9, by the more or less horizontally extending flange 141 of the member 137, at the same time permitting the footrest 138 to be rotated upwardly whereby the same may be positioned substantially in the plane of the front legs 101.

Assuming the device is in operative open position, as illustrated in Fig. 9, it may be folded in the following manner: The sleeves 121 are moved upwardly along the legs 112 to expose the pivotal connections between the legs 112 and the front legs 101, with the various elements of the device assuming substantially the position illustrated in Fig. 14, and it will be noted that the legs 101 and 102 are beginning to rotate about their pivotal connection into substantially a common plane. The member 111 is then rotated downwardly about its pivotal connection with the legs 101, as illustrated in Fig. 15. Rotation of the handle member 111 relative to the legs is then continued and until the handle member is positioned adjacent to the legs, as illustrated in Fig. 11, which discloses the device in almost completely closed position with the legs 101 and 102 lying in substantially a common plane, and the rear wheels nested between the front wheels. The handle member 111 is illustrated in Fig. 11 in slightly open position to more clearly disclose the respective parts, and when the device is in completely closed position, the plane of the handle member is substantially parallel to the common plane of the legs 101 and 102, with the insert portion 114 of the member nested between the rear wheels. The folding is completed by rotating the footrest 138 substantially in the plane of the legs 101 and 102. It will be noted that the width of the completely folded device, with the exception of the wheels, is merely slightly greater than the combined width of the sleeves 121 and legs 101 and 102, and less than the diameter of the large wheels. The folded device may be readily carried by grasping the intermediate portion of the member 122.

Having thus described my invention, it is obvious that various immaterial modifications may be made in the same without departing from the spirit of my invention; hence, I do not wish to be understood as limiting my self to the exact form, construction, arrangement, and combination of parts herein shown and described or uses mentioned.

What I claim as new and desire to secure by Letters Patent is:

1. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, and an object supporting structure including a rigid element extending adjacent to and pivotally connected to the upper ends of the rear members, said rigid element being pivotally connected to the respective slidable members operative to transmit downward forces from said rigid element to said slidable members and maintain the latter in locking position.

2. In a seating device, the combination of a pair of rear members, a pair of front members, each rear member being pivoted to a respective front member intermediate their ends, a generally U-shaped member, the free ends of which are operatively connected to the free upper ends of said front members, said front and U-shaped members being movable relative to one another whereby the legs of the U-shaped member may be positioned in the plane of said front members to form an extension thereof or folded into a position adjacent to and substantially parallel with said members, a member slidably mounted on each of the legs of said U-shaped member and movable to engage the upper portions of the respective front members to rigidly lock the U-shaped member, in extended position, to the front members, a seat member extending adjacent to and pivotally connected to the upper ends of the rear members, said seat member being pivotally connected to the respective slidable members operative to transmit downward forces from said rigid element to said slidable members and maintain the latter in locking position.

3. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, a seat member extending adjacent to and pivotally connected to the upper ends of the rear members, said seat member being pivotally connected to the respective slidable members, and a back member connected to said slidable members.

4. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, a seat member extending adjacent to and pivotally connected to the upper ends of the rear members, said seat member being pivotally connected to the respective slidable members, a back member carried by said slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member.

5. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, a seat member extending adjacent to and pivotally connected to the upper ends of the rear members, said seat member being pivotally connected to the respective slidable members, a back member carried by said slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member, said links each being of substantially U-shape in cross section and adapted to receive the upper portion of the adjacent rear member when the device is in a folded position.

6. In a seating device, the combination of a pair of rear members, a pair of front members, each rear member being pivoted to a respective front member intermediate their ends, a generally U-shaped member, the free ends of which are operatively connected to the free upper ends of said front members, said front and U-shaped members being movable relative to one another whereby the legs of the U-shaped member may be positioned substantially in the plane of said front members to form an extension thereof or folded into a position adjacent to and substantially parallel with said members, a member slidably mounted on each of the legs of said U-shaped member and movable to engage the upper portions of the respective front members to rigidly lock the U-shaped member, in extended position, to the front members, and an object supporting structure including a rigid element extending adjacent to and pivotally connected to the upper ends of the rear members, said rigid element being pivotally connected to the respective slidable members.

7. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a substantially U-shaped member, the side legs of which extend adjacent to and are pivotally connected to the upper ends of the rear members, said last mentioned U-shaped member being pivotally connected adjacent its free ends to the respective slidable members, with the connecting portion of said U-shaped member extending across the front of the cart, a cross member extending between the legs of the handle member, and a flexible member having seat and back portions, the adjacent edges of the seat portion being operatively connected to said U-shaped member, and the top edge of the back portion being operatively connected to said cross bar, said seat portion having a pair of leg receiving openings therein.

8. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended postion, to the front members, a substantially U-shaped member, the side legs of which extend adjacent to and are pivotally connected to the upper ends of the rear members, said last mentioned U-shaped member being pivotally connected adjacent its free ends to the respective slidable members, with the connecting portion of said U-shaped member extending across the front of the cart, and a flexible member having seat and back portions, the adjacent edges of the seat portion being operatively connected to said last mentioned U-shaped member and the top edge of the back portion being operatively connected to the handle member.

9. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a substantially U-shaped member, the side legs of which extend adjacent to and are pivotally connected to the upper ends of the rear members, said last mentioned U-shaped member being pivotally connected adjacent its free ends to the respective slidable members, with the connecting portion of said U-shaped member extending across the front of the cart, and a flexible member having seat and back portions, the adjacent edges of the seat portion being operatively connected to said last mentioned U-shaped member and the top edge of the back portion being operatively connected to the handle member, and a footrest carried by said front members and rotatable into substantially the plane of said front members.

10. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a handle member operatively connected to the free upper ends of said front members, said handle and front members being movable relative to one another whereby the handle member may be positioned substantially in the plane of said front members to form an extension thereof or folded into a position adjacent to and substantially parallel with said members, a pair of members slidably mounted on said handle member and movable to engage the upper portions of the respective front members to rigidly lock the handle member, in extended position, to the front members, and a substantially U-shaped member, the side legs of which extend adjacent to and are pivotally connected to the upper ends of the rear members, said last mentioned U-shaped member being pivotally connected adjacent its free ends to the respective slidable members, with the connecting portion of said U-shaped member extending across the front of the cart, and a flexible member having seat and back portions, the adjacent edges of the seat portion being operatively connected to said last mentioned U-shaped member and the top edge of the back portion being operatively connected to the handle member.

11. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, a back member carried by said slidable members, a kickboard pivotally connected at its upper edge to the front edge of said seat member and rotatable into a plane extending substantially parallel to the plane of said seat member, a footrest pivotally connected at its rear edge to said kickboard adjacent the lower edge of the latter, said footrest being movable into either a plane extending transversely to said kickboard, or into a plane substantially parallel to the plane of said kickboard, and means for supporting said kickboard in operative position.

12. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, and a back member carried by said slidable members.

13. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, a back member carried by slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member.

14. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, a back member carried by slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member, a kickboard pivotally connected at its upper edge to the front edge of said seat member and rotatable into a plane extending substantially parallel to the plane of said seat member, a footrest pivotally connected at its rear edge to said kickboard adjacent the lower edge of the latter, said footrest being movable into either a plane extending transversely to said kickboard, or into a plane substantially parallel to the plane of said kickboard, and means for supporting said kickboard in operative position.

15. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, a back member carried by said slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member, said links each being of substantially U-shape in cross section and adapted to receive the upper portion of the adjacent rear member when the device is in a folded position, a kickboard pivotally connected at its upper edge to the front edge of said seat member and rotatable into a plane extending substantially parallel to the plane of said seat member, a footrest pivotally connected at its rear edge to said kickboard adjacent the lower edge of the latter, said footrest being movable into either a plane extending transversely to said kickboard, or into a plane substantially parallel to the plane of said kickboard, and means for supporting said kickboard in operative position.

16. In a go-cart, the combination of a pair of front wheels and a pair of rear wheels, a pair of spaced rear members lying in substantially a common plane and supported by the rear wheels, a pair of front members lying in substantially a common plane and supported by the front wheels, the respective adjacent front and rear members being pivoted together intermediate their ends, a generally U-shaped handle member, the free ends of which are operatively connected to the free upper ends of said front members, said handle and front members being movable relative to one another whereby the handle member may be positioned substantially in the plane of said front members to form an extension thereof or folded into a position adjacent to and substantially parallel with said members, a member slidably mounted on each of the legs of said handle member and movable to engage the upper portions of the respective front members to rigidly lock the handle member, in extended position, to the front members, a seat member extending adjacent to and pivotally connected to the upper ends of the rear members, said seat member being pivotally connected to the respective slidable members, a back member carried by said slidable members, a pair of arm rests, each of which is pivotally connected adjacent its rear end to a respective slidable member, a connecting link for each of said arm rests, each link being pivotally connected adjacent its upper end to the arm rest associated therewith, and pivotally connected adjacent its lower end to the upper end of the adjacent rear member, said links each being of substantially U-shape in cross section and adapted to receive the upper portion of the adjacent rear member when the device is in a folded position.

17. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, and an object supporting structure including a rigid element extending adjacent to and pivotally connected to the upper ends of the rear members, and means operatively connecting said slidable members and the rigid element when the latter is in an object supporting position, whereby the adjacent portion of said rigid element is supported therefrom and the forces applied by said rigid element to said slidable members are in a direction to maintain the latter in locking position.

18. In a seating device, the combination of a pair of rear members, a pair of front members, each rear member being pivoted to a respective front member intermediate their ends, an extension member operatively connected to the free upper ends of said front members, said front and extension members being movable relative to one another whereby said extension member may be positioned substantially in the plane of said front members to form an extension thereof or folded into a position adjacent to and substantially parallel with said members, a pair of members slidably mounted on said extension member and movable to engage the upper portions of the respective front members to rigidly lock the extension member, in extended position, to the front members, and an object supporting structure including a rigid element, said rigid element being pivotally connected to the respective slidable members, and means operatively connecting the upper ends of the rear members and said rigid element when the latter is in an object supporting position, whereby the adjacent portion of said rigid element is supported thereby and the forces applied by said rigid element to said slidable members are in a direction to maintain the latter in locking position.

NELSON H. PERSON.

REFERENCES CITED

The following references are of record in the file of this patent:

UNITED STATES PATENTS

| Number | Name | Date |
|---|---|---|
| 1,571,538 | Cable | Feb. 2, 1926 |
| 2,457,935 | Stackhouse | Jan. 4, 1949 |
| 2,488,450 | Underwood | Nov. 15, 1949 |
| 2,490,988 | Wheeler | Dec. 13, 1949 |